Patented July 27, 1954

2,684,992

UNITED STATES PATENT OFFICE 2,684,992

METHOD OF PROCESSING BATTERY DEPOLARIZERS

Grenville B. Ellis, Red Bank, N. J., assignor to the United States of America as represented by the Secretary of the Army No Drawing. Application July 2, 1953,
Serial No. 365,789

3 Claims. (Cl. 136—175)

(Granted under Title 35, U. S. Code (1952), sec. 266)

The invention described herein may be manufactured and used by or for the Government for governmental purposes without the payment of any royalty thereon.

This invention relates to methods of processing battery depolarizers, particularly carbon rod-depolarizer units, usually called "cores" or "bobbins" for assembling in Leclanché type primary dry cells.

It is an object of this invention to facilitate operations of assembling primary dry cells particularly Leclanché type dry cells by cooling the bobbin immediately after its manufacture to a temperature below the freezing temperature of the liquid with which the bobbin is wetted so as to obtain a rigid unit that will retain its desired shape and composition until it is assembled into the finished dry cell.

The invention will become more apparent from the following description of the conditions that exist in the manufacture of conventional Leclanché type dry cells.

Fundamentally, the typical cylindrical Leclanché dry cell consists of five major component parts:

The zinc can (to generate electrons), the carbon rod (to allow the electrons generated by the zinc and flowing thru the outer circuit to reach the depolarizing manganese dioxide), the depolarizing mix (to absorb both the electrons coming in thru the carbon rod and the positive zinc ions diffusing thru the electrolyte), the immobilized electrolyte (that separates electronically the zinc and the mix but conducts the positive zinc ions), and the seal (which prevents evaporation of water and excludes atmospheric oxygen which would react with the zinc).

When the external circuit is closed the zinc electrode goes into solution, electrons flow thru the outer circuit to the carbon rod and simultaneously zinc ions diffuse thru the electrolyte into the depolarizer mix. Thus, the manganese depolarizer acts as a sink for both electrons and zinc ions.

Manganese dioxide, for all practical purposes conducts neither electrons nor ions. To provide the necessary electronic conductivity the manganese dioxide is mixed with graphite or a suitably conductive carbon black, while ionic conductivity is obtained by dampening the carbon black-manganese dioxide mixture with a liquid usually consisting of an aqueous solution of ammonium and zinc chloride plus a suitable wetting agent. It is well known that during these operations special precautions for the maintenance of very definite conditions must be maintained. If the manganese dioxide particles are completely covered with carbon black the depolarizer will be ionically insulated, while complete coverage with a film of the above mentioned aqueous solution will insulate it electronically. Ideally, the conditions should be such that each manganese dioxide particle has an electronic contact with a carbon particle while the remaining surface of the dioxide particle is covered with a particle of the above mentioned solution.

In addition to the more obvious factors (such as type of mixer, batch size, rate of mixing, temperature, time, sequence and rate of addition of carbon black and solution, and aging time of the finished mix) there are many less obvious factors to be taken into account such as the electrostatic changes present or built up on the solid components, frictional heating effects associated with mixing, atmospheric humidity, seasonal changes in temperature, etc. Since the composition and the physical conditions of the mix exert the greatest effect upon the ultimate output of the cell a tremendous amount of research time and effort has been devoted to studies of these mixing operations.

Despite the preponderant attention that has been given to the preparation of the mix, the manufacturers of Leclanché type dry cells must still rely on purely empirical methods and rules of thumb for determining the optimum composition and consistency of the depolarizer mix. This is particularly true with regard to the amount of liquid absorbed and held by the mix.

It is known that ability to hold increased amounts of electrolyte are beneficial for the capacity of the cell because increased liquid content of the wet mixture means increased availability of positive ions close to the manganese dioxide particles. Regardless of this beneficial action of increased amounts of electrolyte the liquid retention characteristics of the mix are very important also from the standpoint of the handling of the bobbin in assembling the cell. If the mixture contains too much liquid it becomes too sticky for subsequent handling; such mixtures are usually scrapped or blended with other batches. Under certain conditions overmixing beyond a critical point results in a sharp increase in wetness even though no excess of liquids was originally present; such mixtures too are useless and must be remade in one way or the other.

For the reasons outlined above manufacturers of Leclanché type dry cells usually adhere rigorously to the formulation of the mix that has been established empirically as leading to satisfactory results in both handling and performance. In formulating the mixture it is of course necessary to make a compromise as to the amount of liquid to be present in the mix. This compromise lies somewhere between the maximum amount of liquid which allows easy handling of the mix and the minimum amount which is necessary for the required capacity of the finished dry cell. In spite of all precautions, however, great difficulties are still encountered in maintaining the mix at the right composition after molding the mix into the finished bobbins.

The bobbins are usually molded under pressure to the exact diameter and height required. After ejection from the mold they are placed with others awaiting assembly of the cells. During this time which for various reasons cannot always be kept the same for each batch, the bobbins are subject to changes in both composition and form due particularly to evaporation of the liquid and to mechanical injury. These irregularities often result in cracking or other deformations of the finished bobbin and in marked decrease of capacity of the finished cell, which means that all the work expended in establishing the optimum formulation has been wasted.

I have now found that all these disadvantages may be very simply overcome by submitting the bobbin right after its completion to a cooling or freezing process that transforms the mix from the soft, plastic state into a solid, hard, rigid state. In this hard frozen condition the bobbin is less subject to deformation and loss of liquid and can be kept for a considerable length of time on the shelf without changing its form and composition. In addition thereto the freezing process makes it possible to increase the liquid content of the mix without impairing the handling of the bobbin; for, even a mix which is somewhat sticky because of an excess of liquid becomes solid and rigid after freezing. No difficulties are therefore encountered in handling the frozen bobbin regardless of the amount of liquid present therein.

The simple expedient of freezing the finished bobbin right after its ejection from the mold thus is capable of attaining two considerable advantages at once, that is, greatly increased handling ability of the bobbin and higher electrical capacity of the finished dry cell.

It has been found advantageous to cool the mix before extruding to a temperature at which it is still plastic and thereby reducing the freezing time of the extruded bobbin at least to some extent.

The freezing of the finished bobbin may be achieved in a number of ways. For example, the bobbins may be extruded directly into the openings of a freezing tray and the tray then put into an appropriate refrigeration machine.

The temperature used to bring about the freezing of the finished bobbin must, of course, be below the freezing temperature of the liquid solution used in the mix.

The frozen bobbins may be kept on the shelf for a considerable length of time without deformation and without losing any substantial amount of liquid. They may also be stored under refrigeration when circumstances prevent their assembly in the near future.

All conventional bobbins, those with and without a wrapper of muslin, may be used. The wrapped or unwrapped frozen bobbins are assembled in essentially the same manner as unfrozen bobbins except for the fact that the frozen bobbins require much less care than the unfrozen bobbins.

It will be evident to those skilled in the art that various freezing temperatures and various methods of freezing the bobbins may be used within the broad inventive idea as defined in the appended claims.

What is claimed is:

1. Method of assembling primary dry cells using a depolarizer mix that is in a soft plastic state at the temperature at which the cell is assembled characterized in that the finished depolarizer electrode immediately after its production is submitted to temperatures that bring about a freezing of the mix into a hard, rigid state; and that the hard, frozen depolarizer electrode is used for assembling the dry cell.

2. Method of assembling primary Leclanché type dry cells comprising a zinc anode, a depolarizing mix-carbon rod cathode, an immobilized electrolyte and a seal, characterized in that the depolarizing mix-carbon rod cathode is submitted, immediately after its production, to temperatures that bring about a freezing of the depolarizer mix into a solid state.

3. Method for quick freezing depolarizer electrodes for assembling of primary dry cells according to claim 1 characterized in that the depolarizer mix is chilled, before extruding, to a temperature at which the mix is still in a plastic state.

References Cited in the file of this patent

UNITED STATES PATENTS

| Number | Name | Date |
|--------|------|------|
| 1,497,316 | Askin | June 10, 1924 |